United States Patent
Rao et al.

(10) Patent No.: US 10,193,752 B2
(45) Date of Patent: Jan. 29, 2019

(54) STORAGE SYSTEM UPGRADE

(71) Applicant: EMC Corporation, Hopkinton, MA (US)

(72) Inventors: Vinay G. Rao, Bangalore (IN); Nihar R. Panda, Bangalore (IN); Ajith Balakrishnan, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 259 days.

(21) Appl. No.: 15/083,463

(22) Filed: Mar. 29, 2016

(65) Prior Publication Data
US 2016/0294609 A1    Oct. 6, 2016

(51) Int. Cl.
*G06F 13/00*    (2006.01)
*H04L 12/24*    (2006.01)
*H04L 29/08*    (2006.01)

(52) U.S. Cl.
CPC ........ *H04L 41/082* (2013.01); *H04L 67/1097* (2013.01); *H04L 41/0654* (2013.01); *H04L 41/20* (2013.01); *H04L 41/5009* (2013.01)

(58) Field of Classification Search
CPC ... H04L 41/082; H04L 67/1097; H04L 41/20; H04L 41/5009; H04L 41/0654
USPC .......... 709/223, 224, 220–222, 250
See application file for complete search history.

(56) References Cited

U.S. PATENT DOCUMENTS

| | | | |
|---|---|---|---|
| 8,639,791 B2 * | 1/2014 | Carter | G06F 11/3688 709/223 |
| 9,569,195 B2 * | 2/2017 | Schekochikhin | G06F 9/441 |
| 2011/0289440 A1 * | 11/2011 | Carter | G06F 11/3688 715/771 |
| 2015/0331692 A1 * | 11/2015 | Schekochikhin | G06F 9/441 713/2 |

* cited by examiner

*Primary Examiner* — Kenneth R Coulter
(74) *Attorney, Agent, or Firm* — Krishnendu Gupta; Deepika Bhayana

(57) ABSTRACT

Example embodiments of the present disclosure relate to a method, computer program product, and system for an upgrade of an array specific module in a multipath application comprising suspending all input/output operations associated with the array specific module; and upgrading the array specific module without disrupting any input/output operations associated with the array specific module.

21 Claims, 6 Drawing Sheets

STORAGE SYSTEM UPGRADE

RELATED APPLICATION

This application claim priority from Indian Patent Application Number 1617/CHE/2015 filed on Mar. 30, 2015 titled "STORAGE SYSTEM UPGRADE" filed at the Office of the Controller General of Patents, Trademarks and Geographical Indicators at Chennai, India, the contents of which are herein incorporated by reference in entirety.

DISCLAIMER

Portions of this patent document/disclosure may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure generally relates to storage systems.

BACKGROUND

Conventionally, a SAN environment may include a plurality of hosts, a fabric and an array (data storage subsystems), and there may be multiple physical paths, or buses, to each data storage subsystem. These paths may be typically managed by a multipath software or multipath application, (such as PowerPath), which may form a part of the SAN environment.

Typically, multipath software may be a host-based software for data path management, recovery and optimized load balancing. Multipath software may typically automate, standardize and optimize data paths in virtual, physical and cloud settings to deliver peak availability and performance. Multipath software may allow users meet lofty service levels with efficient application performance, and may be available for a host of operating systems.

SUMMARY

Example embodiments of the present disclosure are related to a method, computer program product, and system for an upgrade of an array specific module in a multipath application comprising suspending all input/output operations associated with the array specific module; and upgrading the array specific module without disrupting any input/output (I/O) operations associated with the array specific module.

BRIEF DESCRIPTION OF THE DRAWINGS

Objects, features, and advantages of example embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

Figure 1:
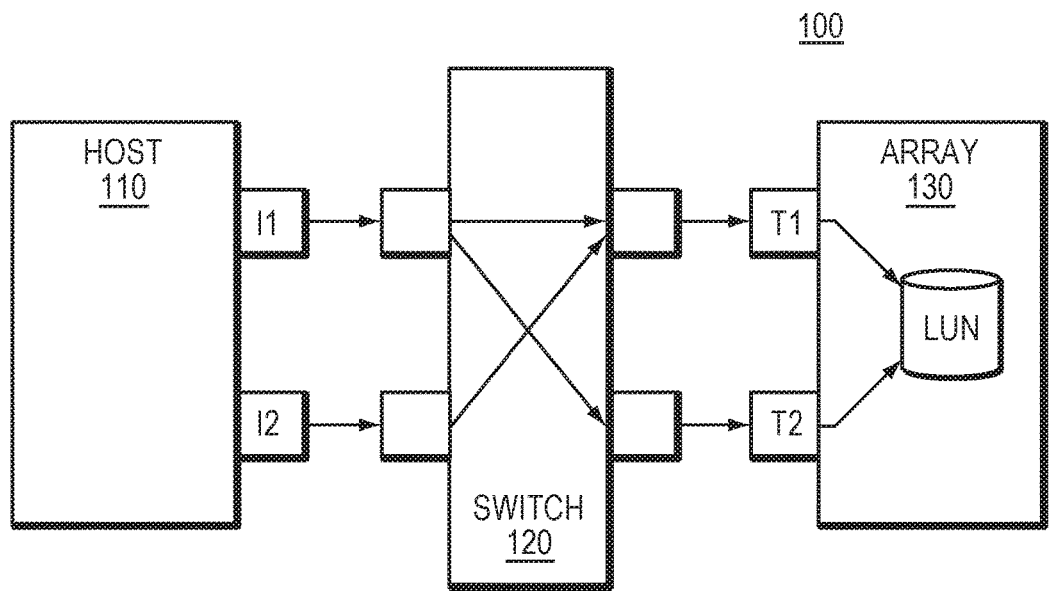
FIG. 1 is an exemplary architecture of a multipath deployment in a SAN environment 200 in accordance with an embodiment of present disclosure.

It may be noted that the flowcharts and block diagrams in the figures may illustrate the apparatus, method, as well as architecture, functions and operations executable by a computer program product according to various embodiments of the present disclosure. In this regard, each block in the flowcharts or block diagrams may represent a module, a program segment, or a part of code, which may contain one or more executable instructions for performing specified logic functions. It should be further noted that in some alternative implementations, functions indicated in blocks may occur in an order differing from the order as illustrated in the figures. For example, two blocks shown consecutively may be performed in parallel substantially or in an inverse order sometimes, which depends on the functions involved. It should be further noted that each block and a combination of blocks in the block diagrams or flowcharts may be implemented by a dedicated, hardware-based system for performing specified functions or operations or by a combination of dedicated hardware and computer instructions.

DETAILED DESCRIPTION

Embodiments of the present disclosure relate to data storage, and more specifically to a non-disruptive upgrade of a loadable array module (LAM). Embodiments of the present disclosure may be described with reference to the accompanying drawings. Although some embodiments of the present disclosure have been displayed in the accompanying drawings, it should be understood that the present disclosure can be implemented in various other forms, and should not be strictly limited to embodiments described herein. On the contrary, these embodiments are provided to make the present disclosure understood more thoroughly and completely. It should be understood that the accompanying drawings and embodiments of the present disclosure are merely for illustration, rather than being read as a limitation on the scope of the present disclosure.

Generally speaking, all terms used herein should be understood according to their general meanings in the art unless otherwise explicitly stated. All mentioned "a/an/the/ said element, device, component, apparatus, unit, step, etc." should be construed as at least one instance of the above element, device, component, apparatus, unit, step, etc., and it is not excluded to comprise a plurality of such elements, devices, components, apparatuses, units, steps, etc., unless otherwise explicitly stated.

In certain embodiments, multipathing application/technology (for example EMC®'s PowerPath®) may enable automatic failover and recovery. Generally, multipathing technology may remove a threat of program disruptions that may arise from cable and adapter failures, and user related errors. Usually, automatic failover may alternate data paths to keep users online. Conventionally, multipath applications may utilize a dynamic path testing to eliminate faulty paths and may restore functional ones to service without application disruption or user intervention.

In certain embodiments, multipathing technology may choose paths from an I/O source to a storage array. In many embodiments, multipathing applications may have interfaces to different respective storage arrays. In some embodiments, multipathing applications may have a specific interface to specific storage arrays. In certain embodiments, an interface to a storage array may be referred to as an array module or an array specific module. In some embodiments, techniques of the current disclosure may enable an array module or an array specific module to be reloaded or upgraded without causing downtime or disruption in a multipath environment.

Typically, multipathing applications may be deployed by a multitude of businesses as a path-management solution. Usually, it may be a flexible, automated tool that standardizes management of data paths that may be useful to fulfill service-level agreements and scale out mission-critical applications.

Generally, multipathing applications may be implemented as a computer program. Typically, multipathing applications may be a performance enhancement that creates multiple paths between a computer system's CPU and its mass storage devices through controllers, bridge devices, buses and switches. Conventionally, the primary functionality of multipathing applications may be to re-route data via another device should a port, switch or controller fail.

Typically, an implementation of multipathing applications may consist of loadable array module (LAM) (hereinafter also referred to as array specific modules). In certain embodiments, a LAM may provide a storage system (array) specific knowledge to a multipathing extension and a user space code. In certain embodiments, a LAM module may enable a multipathing application to interface with a storage system. Generally, a LAM may encapsulate vendor specific and product specific knowledge about a storage system. Usually, LAMs may be configured to provide this information to LAM independent modules, which may interface with the LAMs, through a specific LAM entry point. Typically, a LAM entry point may be initialized in an operation at a time of initialization of the LAM. Conventionally, LAMs may be generally independent from the rest of a multipathing application, but LAM modules may be statically linked to other modules in a multipathing application. In general, however, LAM modules may need to be upgraded (updated) from time to time. Usually, during an update/upgrade to a LAM module there may be a very high possibility of disruption or breakdown of user related applications in a SAN environment. Conventionally, upgrading a LAM module may require a multipathing application to be shut down while an upgrade occurs.

In certain example embodiments of the disclosure, statically linking LAMs may not result in effective use of paths created by a multipathing application and hence may not maximize system performance. In certain embodiments, LAM (also referred to herein interchangeable as array specific modules) may be modules in a multipathing implementation that may be configured to provide a storage system (array) with specific knowledge about a multipathing extension and a user space code. In some embodiments, a LAM may encapsulate vendor specific and product specific knowledge about a storage system. In some embodiments, a LAM may provide vendor specific and product specific information to a LAM independent code through a LAM entry point that may be initialized in an operation structured at a time of initialization of a multipathing implementation.

Generally, LAMs may be considered conceptually independent from multipathing implementation, but a LAM module may be statically linked to other modules in a multipathing implementation. In some embodiments, static linking of modules may cause several issues during runtime, such as disruption or breakdown of a user application, while adding or enhancing support for newer arrays or array versions for existing LAM modules in a multipathing application. Therefore, in one embodiment, a Dynamic Loadable Array Module (DLAM) may enable dynamic loading of a LAM module. In certain embodiments, a DLAM may load and attach user space and kernel portions of a LAM to a multipathing application during runtime. In certain embodiments, a DLAM may provide a more flexible and faster mechanism to add or enhance support for newer arrays or array versions.

In one embodiment, to perform a LAM upgrade, drivers associated with the LAM may need to be unloaded. In a further embodiment, after unloading of a LAM driver for a particular LAM module, a LAM may be upgraded by loading new drivers for a LAM module. In a further embodiment, after a LAM module is upgraded, (operation is completed), the LAM module may need to be activated (brought up) before beginning operations associated with a LAM. In a further embodiment, an operation to upgrade a LAM may require bringing down or halting LAM operations, which in turn may require bringing down user applications, thereby disrupting services related to user applications that may be using a LAM.

Embodiments of the disclosure may include a system, a computer program product a method for upgrading or updating, in a non-disruptive manner, an array specific module (loadable array module or LAM) in a multipathing/multipath environment. In one embodiment a multipath application may include an array independent module and an array specific module. In a further embodiment, an array independent module may be coupled to an array specific module by an interface module (hereinafter also referred to as an array interface module or a bridge). In a further embodiment, an array independent module and an array specific module may be communicatively coupled with each other and may interchange specific tasks associated or assigned by a user application. In a further embodiment, upgrading a LAM module may include providing a trigger for an upgrade to an array specific module of a multipath application. In a further embodiment, upgrading a LAM module may include identifying a trigger for an upgrade to an array specific module of a multipath application. A further embodiment may include checking a status of an array specific module. In a further embodiment, based on a determination of a status (current status) of an array specific module to be an "in-progress" state, all input/output (I/O) operations associated with that array specific module may be suspended. In a further embodiment, upgrading an array specific module may occur without disrupting any input/output operations associated with that array specific module.

In a further embodiment an interface module (which may be referred to herein as a bridge) may be created between an array specific module and an array independent module of a multipath application. In a further embodiment an interface module may be configured to maintain a current status of an array specific module. In yet a further embodiment, there may be a one-to-one mapping of a current state between an array independent module and an array specific module. In a further embodiment, an interface module may be configured to maintain a current status and a one-to-one mapping between an array independent module and an array specific module. In yet a further embodiment, a current status of an array specific module may be registered with an array independent module.

In a further embodiment, a current status for an array specific module may be assigned at least one of the following states—an "associated" state or an "in-progress" state or an "invalid" state. In a further embodiment, a state of an array specific module may deal/comply with a particular situation regarding an upgrade of a specific module as will be discussed in a later part of this disclosure.

In a further embodiment, the current status may be an "invalid" state. In yet a further embodiment, an "invalid" state may indicate that there may not be an association (connection or link) between an array independent module and an array specific module of a multipath application. In yet a further embodiment, on/after first installation of an array specific module in a multipath application a current status of the array specific module may be changed from an "invalid" state to an "associated" state (an associated state may also be referred to herein as a connected state or a linked state). In a further embodiment, when a current status of an array specific module may be identified as an "associated" state, it means that there may be an association between the array independent module and the array specific module of a multipath application.

In a further embodiment, a current status may be identified as an "in-progress" state. In yet a further embodiment, an "in-progress" state may indicate that an upgrade to an array specific module may be in progress. In yet a further embodiment, on completion of an upgrade to an array specific module a current state of an array specific module may be changed from an "in-progress" state to an "associated" state.

In a further embodiment, when an array specific module indicates a state as an "in-progress" state, input/output operation associated with an array specific module may be suspended. In yet a further embodiment, a suspended input/output operation pertaining to an array specific module may be resumed after a current state of array specific module status may be changed to from "in-progress" state to an "associated" state. In a further embodiment, a state change may occur after an upgrade to an array specific module may be completed. In a further embodiment, by upgrading a LAM in accordance with certain embodiments of the present disclosure no disruption of normal input/output operations to an array specific module may occur during an upgrade process.

In a further embodiment, on determination that a current status may be an "in-progress" state, for any periodic check of paths and logical units associated with an array specific module, an "inconclusive" result may be returned. In yet a further embodiment, on determination that a current status may be changed to an "associate" state from an "in-progress" state, a periodic check of paths and logical units for an array specific module may be resumed.

In one embodiment of the present disclosure, a current state of an array specific module may be monitored by an interfacing module (bridge). In a further embodiment there may be a one-to-one mapping between an array specific module and an interfacing module. In a further embodiment there may be a one-to-one mapping between an array independent module and an array specific module. In a further embodiment, when an array specific module may be in an "in-progress" state, any user applications or other associated application may be suspended to allow upgrade of an array specific module. In a further embodiment, on completion of an upgrade of an array specific module, a current status of the array specific module may be changed from an "in-progress" state to an "associated" state. In an exemplary embodiment, an upgrade for an array specific module may be an upgrade from an older version to a newer version, where the newer version may contain new functionalities. In an exemplary embodiment, performing an upgrade to an array specific module may imply that new functionalities may replace older functionalities associated with the array specific module.

Reference is now made to FIG. 1, which illustrates an exemplary architecture of a multipathing deployment in a SAN environment 100 in accordance with one embodiment of the present disclosure. In the embodiment of FIG. 1, SAN environment 100 includes host 110, fabric 120 (a fabric typically comprising a plurality of switches) and array 130 (which comprises the logical units or disks). Host 110 and array 130 include a plurality of devices but for simplicity a single device is illustrated in FIG. 1.

As illustrated in FIG. 1, SAN environment 100 consists of fabric 120. Fabric 120 may consists of a number/plurality of switches 121, which are physical switches. Amongst the physical switches that are in fabric 120, one of the many physical switches may be assigned to be a master switch.

As illustrated in the exemplary embodiment of FIG. 1, the SAN environment, in addition to the host and the fabric, also comprise array 130, which includes a number of storages such as a LUN (logical unit number). As illustrated in exemplary embodiment of FIG. 1, each array in the SAN may have an associated Array Port illustrated as T1 and T2.

As illustrated in FIG. 1, each HBA (I1, I2) is coupled to at least one switch port, and each array port (T1, T2) of the arrays is similarly coupled to a switch port. Host 210 has Host Bus Adapter (HBA) I1 and I2, and each HBA may include one or more HBA ports. Host 110 includes a plurality of host bus adapters I1 and I2. Each host bus adapters (I1 and/or I2) of host 110 are zoned to multiple array ports/director ports (T1 and/or T2) on array 130 (the storage), via the fabric 120, and may include multiple possible paths. Each connection from host 110 to array/director port includes a combination of different host bus adapter (I1 and I2 illustrated in the exemplary FIG. 1) and an array port (T1 and T2 illustrated in exemplary FIG. 1).

As illustrated in FIG. 1, host 110 is coupled/connected to array 130 through a switch 120 (a fabric). After zoning of the host Initiators (I1 and I2) with the Array Targets (T1 and T2), there exists a maximum possibility of four (4) connections from the Host to the Array, i.e., $I_1 \rightarrow T_1$, $I_1 \rightarrow T_2$, $I_2 \rightarrow T_1$, $I_2 \rightarrow T_2$.

In one embodiment, a host may comprise a Host Bus Adapter (HBA) I1 and I2. In a further embodiment, each HBA may include one or more HBA ports. In a further embodiment, a host controller or host adapter or host bus adapter (HBA) may be used to connect a host system (a computer) to other devices and/or storage devices in a network, i.e., SAN environment.

In one embodiment, other elements (hardware/software/firmware) may also be present within a SAN environment such as the environment of FIG. 1. Elements disclosed with respect to the exemplary embodiment as illustrated in FIG. 1 should not be construed or be intended to limit the scope of the present disclosure. In a further embodiment, there may be multiple hosts in a SAN environment.

In one embodiment, a host may be a computer system or may be any other form of computing device having at least a processor and a memory that is attached to the SAN. In a further embodiment a host may be a laptop computer, a PDA, a tablet or a mobile phone. In a further embodiment, a host may be configured for running/executing an operating system. In a further embodiment, a host may be configured to execute a multipathing application.

In one embodiment, a fabric may be a logical term for a collection/plurality of physical switches. In a further embodiment, a fabric may be designed/configured to perform the role of a container for all switches. In a further embodiment, a master switch may contain zoning information and other intelligence belonging to all other physical switches and itself in that fabric. In a further embodiments, there may exist a plurality of switches, each switch port amongst the plurality of switches may be interlinked to another switch port.

In certain embodiments, hosts, such as those of FIG. 1 may be an exemplary computer systems or may be any other form of computing device having at least a processor and a memory that may be attached to a SAN and may include a laptop computer, a PDA, a tablet, a mobile phone etc. In a further embodiment, if there are a number of hosts, then each of these hosts in a SAN may be configured for executing (hereinafter also referred to as running/active) a different operating system. In yet a further embodiment, a multipath application may be restricted to be running on one of a plurality of hosts. In a further embodiment, an operating system executed by a host may be specific to a host, and may be for example a WINDOWS® operating system or a LINUX® operating system or a MAC® operating system. In one embodiment, all the plurality of host in a SAN may have same operating systems or may include a combination of different operating systems.

In one embodiment, a HBA may be used for connecting devices such as a SCSI, a Fiber Channel, an eSATA, and other such devices. However, in other embodiments, devices used for connecting to an IDE, an Ethernet, a FireWire, and other systems may also be referred to as a host bus adapter. In a further embodiments, network interface controller (NIC) may be referred to more often for devices used for connecting to computer networks. In a further embodiment, the term converged network adapter may be applied when protocols such as an iSCSI or a Fiber Channel over Ethernet allow a storage and a network functionality over a same physical connection.

In one embodiment, LUN is a unique identifier that may be used to designate an individual hard disk device or a collection of hard disk devices for address by a protocol associated with a SCSI, iSCSI, Fiber Channel (FC) or similar interface. In a further embodiment, LUNs may be central to management of block storage arrays shared over a storage area network (SAN).

In one embodiment, a multipathing software/application may reside at a host side (or at a predetermined location in the SAN environment), and may be configured to view all possible paths to from a host to a LUN. In a further embodiment, a multipathing application may be configured to provide load balancing and failover capability for a LUN.

Figure 2:
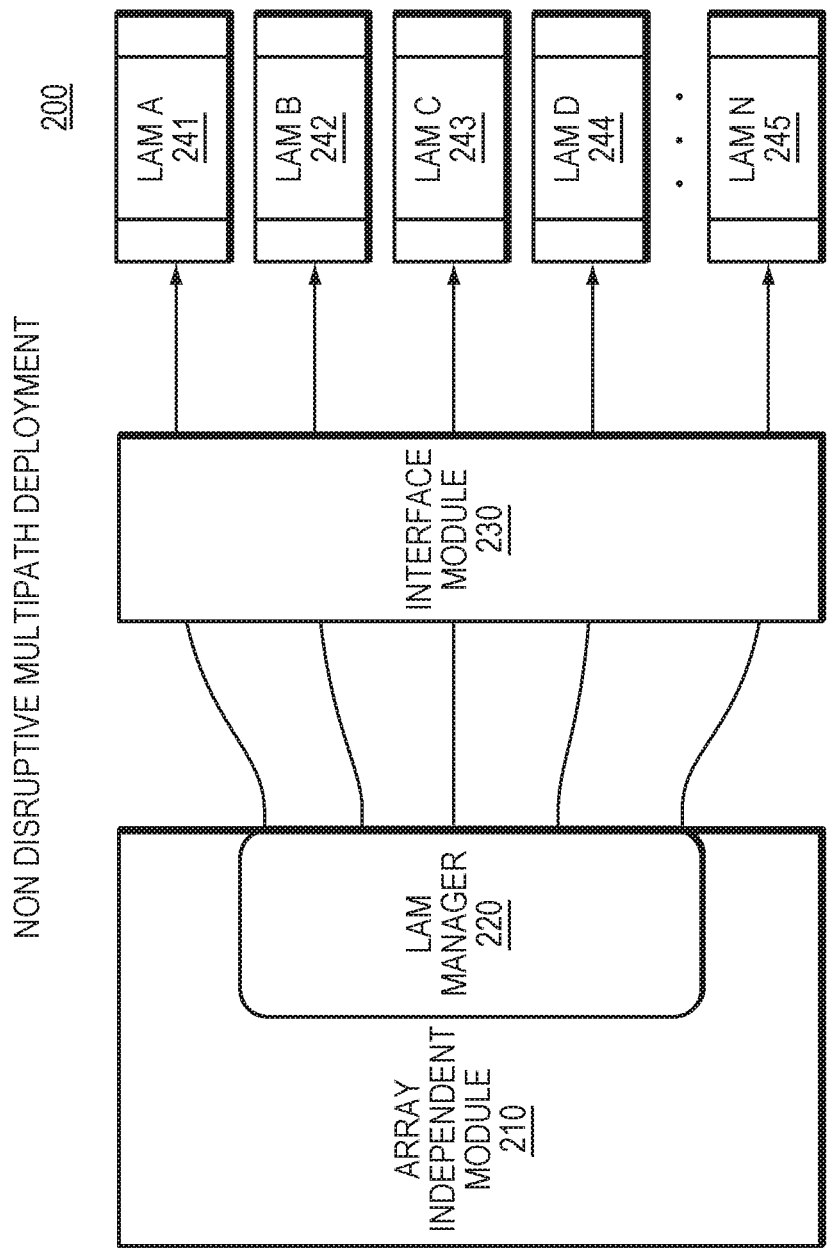
FIG. 2 is a simplified illustration of an exemplary multipath module 300 in accordance with an embodiment of the present disclosure.

Reference is now made to FIG. 2, illustrating an exemplary architecture of a multipath deployment 200 in accordance with an embodiment of the present disclosure. The exemplary embodiment in FIG. 2 illustrates a multipath application for performing non-disruptive upgrades to an array specific module. The multipath application amongst other standard components, includes an array independent module 210, a LAM Manager 220 (array specific module manager), a plurality of array specific module LAM A 241 . . . LAM N 245, and an interface module 230 (a bridge) that couples the array independent module and the array specific modules, and interface module 230 may store a current status associated with the array specific module.

As illustrated in FIG. 2 multipath module 200 comprises storage system independent module (array independent module) 210 and storage system (array) specific module (LAM or array specific module) 241 . . . 245. As illustrated in FIG. 2 array independent module 210 and array specific modules 241 . . . 245 are be loosely coupled to each other. A loose coupling between these two modules is be achieved by an interface module 230 (LAM interface bridge or simply bridge). In the event of LAM interface bridge being present according to the embodiments of the present disclosure a one-to-one mapping between LAM interface bridge 230 and array specific module 241 . . . 245 is created and maintained in LAM interface bridge 230.

Array independent module 210 interacts with array specific module 241 . . . 245, for specific information depending on the vendor/supplier of the array (storage system). Array specific module 241 . . . 245 normally includes vendor related and/or product related information.

As illustrated in FIG. 2 array specific module (LAM) 241 . . . 245 is enabled to be upgraded non-disruptively, and applications using devices from these arrays from the array specific modules for input/output operation may not be required to be stopped. Here LAM A 241, LAM B 242, LAM C 243, LAM D 244 and LAM N 245 may be any array specific software for example from vendors such as Symmetric, VNX, VPLEX, etc., which need to be upgraded.

LAM manager 220, which is part of the array independent module, provides an interface to array specific module 241 . . . 245, for the purpose of registering and/or unregistering itself.

In the example embodiment of FIG. 2, multipath module 200 may be configured to be a part of an Operating System (OS) Kernel driver. In a further embodiment, multipath module may reside in an Operating System input/output (I/O) stack and may be configured to filter all I/O (input/output operations) devices in an array. In a further embodiment, responsibility of a multipath module may be to perform load balancing of I/O across redundant connection to a device within a SAN environment. In a further embodiment, a multipath module may be configured to enable a failover when one of the connections to a device goes down due to a hardware issue in a fabric.

In one embodiment, each vendor of a storage system (array) has a vendor specific information and a product specific information present in an array specific module. In a further embodiment, an array independent module interacts with an array specific module for specific information depending on a vendor/supplier of an array (storage system).

In one embodiment, an advantage of loose coupling between an array independent module and an array specific module may add a capability to upgrade the array specific module in a non-disruptive manner. In another embodiment, interaction that may be required between an array independent module and an array specific module may require a caller (function call) to check a current status of an interface module associated with an array specific module.

In one embodiment, multipath module may communicate through an interface module when interacting with an array specific module has a one-to-one mapping between an interface module and a LAM.

In a further embodiment, an interface module may include the following states, namely, an "associated" state, an "in-progress" state and an "invalid" state. In a further embodiment, each state of an interface module may be an indicator that a particular functionality is being performed by array specific module. In a further embodiment, a LAM Manager and an interface module may be combined into a single module (for example a LAM interface).

In one embodiment upgrading, a LAM, preferably in a non-disruptive manner, may comprise identifying/providing a trigger for an upgrade to an array specific module of a multipath application. In a further embodiment, when a trigger is identified a check may be performed on a current status of an array specific module. In a further embodiment, on determination of a current status of an array specific module being in an "in-progress" state, input/output (I/O) operations associated with an array specific module may be suspended. In a further embodiment an array specific module may be upgraded without disrupting any input/output operations associated with that array specific module.

In a further embodiment an interface module (a bridge) may be configured to maintain a current status of an array specific module. In a further embodiment, a one-to-one mapping of a current state between the array independent module and an array specific module may be maintained. In a further embodiment, a LAM Manager may facilitate registering a current status of an array specific module with an array independent module.

In a further embodiment a current status for an array specific module may be assigned at least one of the following states—an "associated" state or an "in-progress" state or an "invalid" state. In a further embodiment, a current status may be identified as an "invalid" state, wherein an "invalid" state indicates that there may be no association (connection or link) between an array independent module and an array specific module.

In one embodiment, after first installation of an array specific module, a current status for an array specific module that is installed may be changed from an "invalid" state to an "associated" state. In a further embodiment, when a current status of an array specific module is identified as "associated" state, it may means that there may be an association between an array independent module and an array specific module of a multipath application.

In one embodiment, a current status may be identified to be an "in-progress" state. In a further embodiment a current status being in an "in-progress" state may indicate that an upgrade to an array specific module may be under progress. In a further embodiment, on completion of an upgrade to an array specific module a current state of the array specific module may be changed from an "in-progress" state to an "associated" state.

In one embodiment, when an array specific module is in an "in-progress" state, input/output operation associated with an array specific module may be suspended. In a further embodiment, suspended input/output operations may be resumed after a current state of an array specific module status changes to from an "in-progress" state to an "associated" state. In yet a further embodiment, a current status may change from "in-progress" state to an "associated" state after an upgrade to an array specific module is completed. In a further embodiment, because input/output operations to an array specific module being upgraded are suspended, there may be no disruption of operations with respect to an array specific module being updated. In a further embodiment, operation with respect to all other array specific modules continue in a normal manner as for those array specific modules a current state is an "associated" state.

In one embodiment, on determination of a current status being in an "in-progress" state, an 'inconclusive' result may be returned for any periodic health check made for a path and/or a logical unit associated with an array specific module. In a further embodiment, on determination of a current status being changed from an "in-progress" state to an "associate" state an attempt may be made to retry a periodic health check of a path and/or a logical unit for an array specific module.

In one embodiment, a current state of an array specific module may be monitored by an interface module. In a further embodiment, when an array specific module may be found to be in an "in-progress" state, user applications and/or other applications associated with that particular array specific module in the "in-progress" state may be suspended to allow upgrade of an array specific module. In a further embodiment, when a current status of an array specific module continues to be in an "in-progress" state, suspension of an array specific module may allow upgrades to be made. In a further embodiment, on completion of an upgrade of an array specific module a current status of the array specific module may be changed from an "in-progress" state to an "associated" state.

In one embodiment, an upgrade for an array specific module may be an upgrade from an older version to a newer version. In a further embodiment, a newer version may contain new functionalities. In a further embodiment, on performing an upgrade to an array specific module, new functionalities may replace older functionalities associated with an array specific module.

Figure 3:
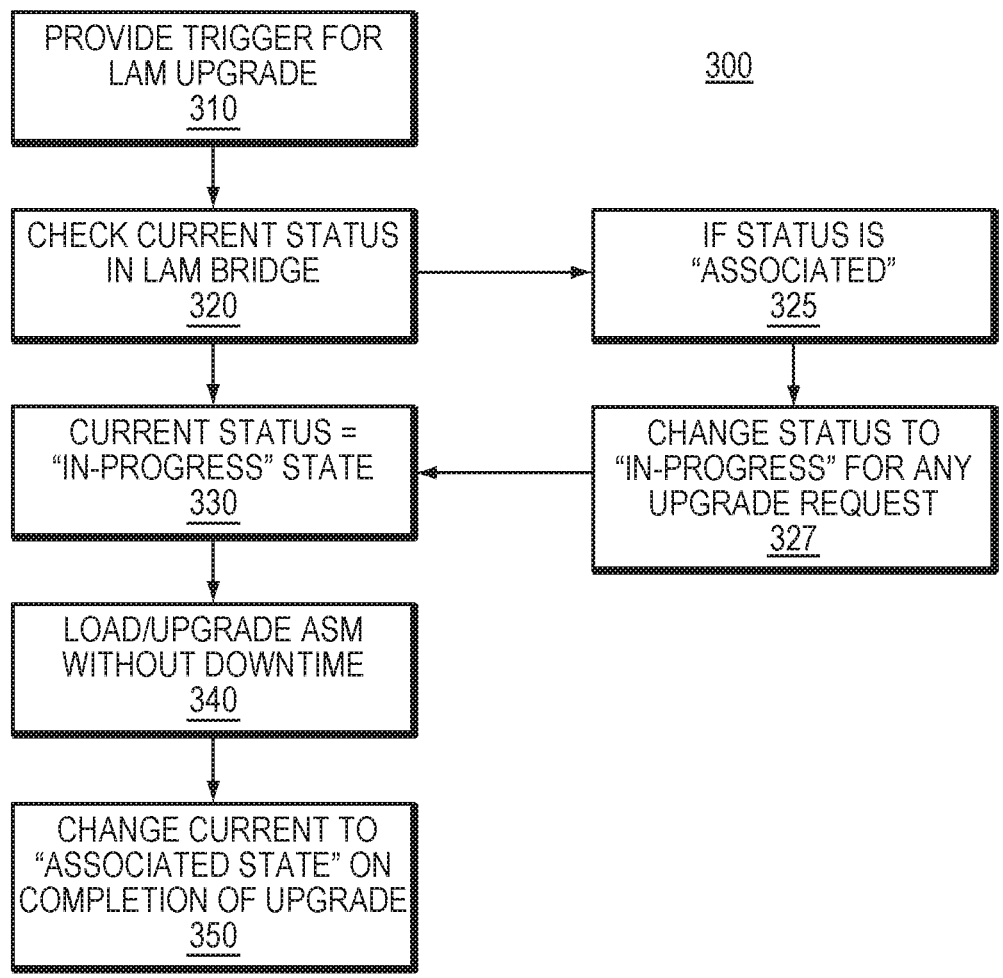
FIG. 3 is a simplified block diagram illustrating an exemplary method 300 for performing multipath upgrade in accordance with an embodiment of the present disclosure.

Reference is now made to FIG. 3 that illustrates an exemplary method 300 for performing an upgrade to an array specific module in accordance with an embodiment of the instant disclosure. In step 310 a trigger is provided or identified for a LAM upgrade. Once a trigger is identified by a multipath module, in Step 320 a check is performed to determine a current status of the LAM.

In Step 325 if a current status of an array specific module is determined as an "associated" state, then an upgrade to the array specific module may not be allowed. For an update to occur, based on an update request identified, a current state is changed to an "in progress" state in Step 327.

In Step 330, if it is determined that a current status of an array specific module may be the "in-progress" states, then in Step 340 an array specific module (LAM) is upgraded without distrusting any other services or applications that are executing on the system, in a non-disruptive manner. Once the upgrade to the array specific module is completed in step 340, in Step 350 a current status of the array specific module is changed from an "in-progress" state to an "associated" state.

In one embodiment, an upgrade may simply be a change of the array specific module version that may incorporate newer functionalities for an array specific module. In a further embodiment, once an upgrade is performed, a current status of an array specific module may be changed to an "associated" state and normal operation may then resume. In a further embodiment, once an upgrade to an array specific module is completed then a current status for that array specific module changes from an "in-progress" state to an "associated" state. In a further embodiment, in order to perform an upgrade to an array specific module a current status of the array specific module may be changed from the "associated" state to an "in-progress" state, thereby allowing an upgrade to the array specific module to occur.

Figure 4:
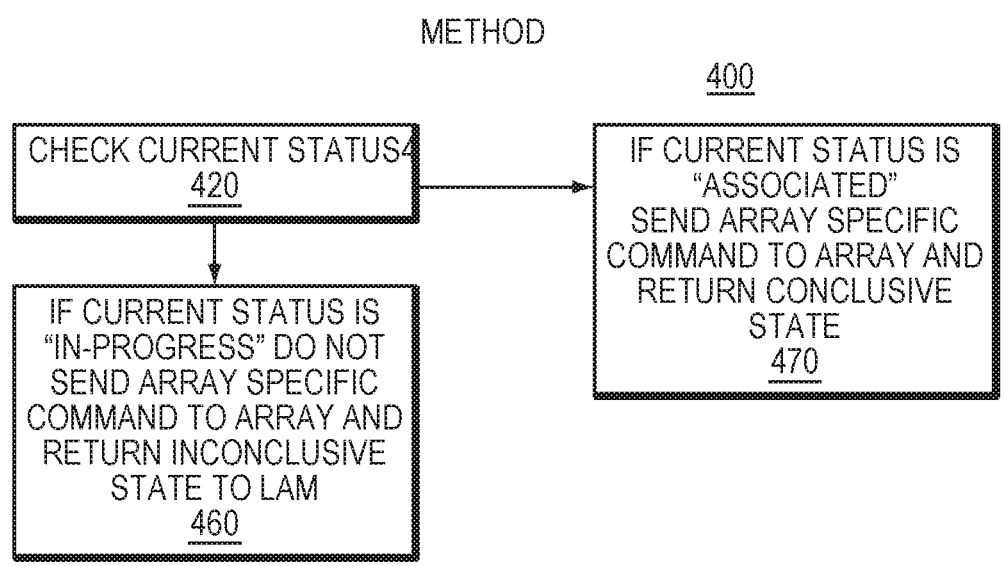
FIG. 4 is a simplified block diagram illustrating an exemplary method 400 for performing a health check in accordance with an embodiment of the present disclosure.

Reference is now made to and exemplary method 400 illustrated in FIG. 4, which is an extension of the method of FIG. 3 in accordance with an embodiment of the instant disclosure. In Step 420 a check is made on the current status for an array specific module, and if the current status is in the "in-progress" state, then as in Step 460, no array specific commands are transmitted to the array specific module, and a "inconclusive" result is returned, for any periodic check (health check) of a path and/or a logical unit associated with an array specific module. In step 420 indicates the current status to be in the "associated" state, then as in step 470, array specific command may be transmitted to an array specific module and a "conclusive" result may be returned, for any periodic health check of a path and/or a logical unit associated with that array specific module.

Figure 5:
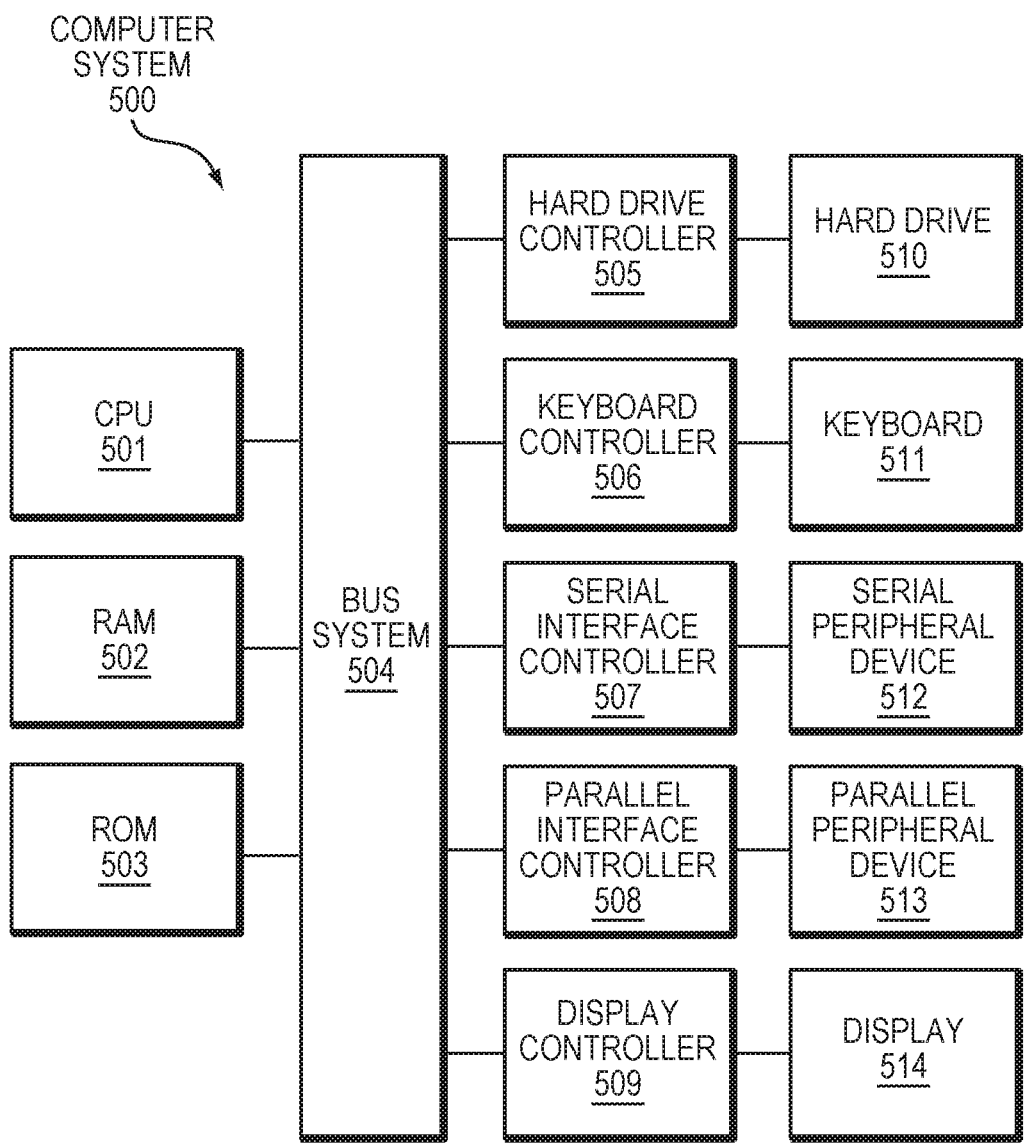
FIG. 5 schematically illustrates a block diagram of an exemplary computer system 100, in accordance with an embodiment of present disclosure.

Reference is now made to the example embodiment of FIG. 5, which illustrates an exemplary computer system 500 in accordance with an embodiment of the present disclosure. As illustrated in FIG. 5, the computer system 500 includes: CPU (Central Process Unit) 501, RAM (Random Access Memory) 502, ROM (Read Only Memory) 503, System Bus 504, Hard Drive Controller 505, Keyboard Controller 506, Serial Interface Controller 507, Parallel Interface Controller 508, Display Controller 509, Hard Drive 510, Keyboard 511, Serial Peripheral Equipment 512, Parallel Peripheral Equipment 513 and Display 514. Among above devices, CPU 501, RAM 502, ROM 503, Hard Drive Controller 505, Keyboard Controller 506, Serial Interface Controller 507, Parallel Interface Controller 508 and Display Controller 509 is coupled to System Bus 504. Hard Drive 510 may be coupled to Hard Drive Controller 505. Keyboard 511 is coupled to Keyboard Controller 506. Serial Peripheral Equipment 512 is coupled to Serial Interface Controller 507. Parallel Peripheral Equipment 513 is coupled to Parallel Interface Controller 508. Display 514 is coupled to Display Controller 509. It should be understood that the structure as illustrated in FIG. 5 is only for exemplary purposes rather than any limitation to the present disclosure. In some embodiments, some other devices may be added to or removed from a computer system, such as computer system 500, based on specific situations. The exemplary computer system of FIG. 5 is discussed for illustrative purpose and should not be construed as a limitation on the embodiments or scope of the present disclosure. For example, the computer system of FIG. 5 may be a representative of a host computer or may be part of a fabric or may be part of an array, and the multipath application may reside preferably on one of the host side perform multipath operation coupling the hosts with the fabric and the array.

Figure 6:
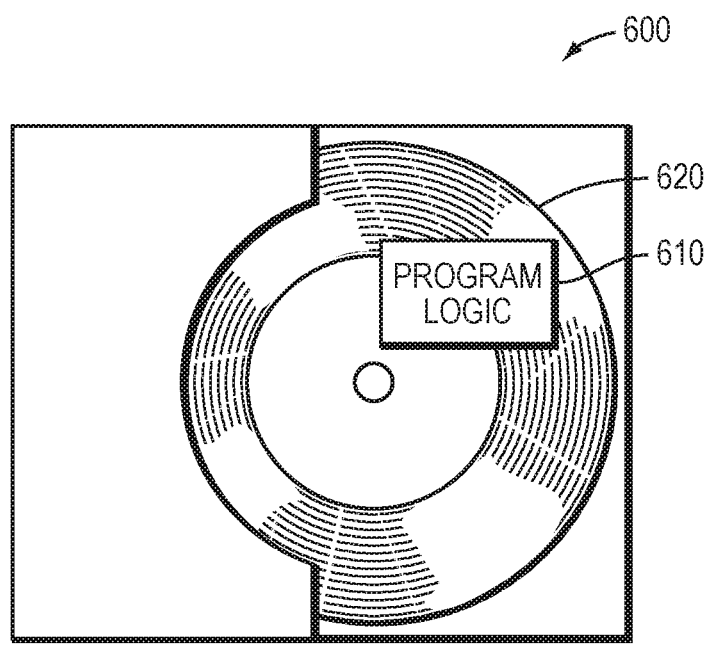
FIG. 6 is a diagram illustrating an example embodiment method of the present disclosure embodied as program code or a program product 500 in accordance with an embodiment of the present disclosure.

Reference is now made to FIG. 6 that shows an exemplary embodiment of program logic 605 embodied on a computer-readable medium 610 as shown, and wherein the logic 605 is encoded in computer-executable code configured for carrying out the gas controlling process of this invention, thereby forming a computer program product 600.

Refer now to an example embodiment wherein methods and apparatus of this disclosure may take the form, at least partially, of program code (i.e., instructions) embodied in tangible non-transitory media, such as floppy diskettes, CD-ROMs, hard drives, random access or read only-memory, or any other machine-readable storage medium. In one embodiment, when a program code is loaded into and executed by a machine, the machine may become an apparatus for practicing embodiment of the disclosure. In a further embodiment, when implemented on one or more general-purpose processors, a program code may combine with such a processor to provide a unique apparatus that operates analogously to specific logic circuits. In a further embodiment, a general purpose digital machine may be transformed into a special purpose digital machine. In a further embodiment, a processor may be a physical processor or one or a virtual processor. In certain embodiments, a virtual processor may correspond to one or more or parts of one or more physical processors.

The logic for carrying out the method may be embodied as part of the aforementioned system, which is useful for carrying out a methods described with reference to embodiments shown in, for example FIG. 1, FIG. 2, FIG. 3 and FIG. 4. For purposes of illustrating the present disclosure, the disclosure is described as embodied in a specific configuration and using special logical arrangements, but one skilled in the art will appreciate that the device is not limited to the specific configuration but rather only by the claims included with this specification.

The scope of the disclosure is limited only by the claims and the disclosure may encompass numerous alternatives, modifications, and equivalents. Numerous specific details are set forth in the above description in order to provide a thorough understanding of the invention. These details are provided for the purpose of example and the disclosure may be practiced according to the claims without some or all of these specific details. For purpose of clarity, technical material that is known in the technical fields related to the disclosure has not been described in detail so that the disclosure is not unnecessarily obscured. Accordingly, the above implementations are to be considered as illustrative and not restrictive, and the disclosure is not to be limited to the details given herein, but may be modified within the scope and equivalents of the appended claims.

What is claimed is:

1. A method for upgrading an array specific module of a multipath application, the method comprising:
   checking a status associated with the array specific module, the array specific module being associated with an array independent module of the multipath application, in order to register the status of the array specific module with the array independent module;
   on determination the status of the array specific module is an "in-progress" state,
      suspending all input/output operations associated with the array specific module; and
      upgrading the array specific module without disrupting input/output operations associated with the array specific module.

2. The method of claim 1, further comprising:
   coupling the array specific module and the array independent module of the multipath application via an interface module, wherein the interface module maintains the status associated with the array specific module.

3. The method of claim 1, further comprising:
   maintaining the status associated with the array specific module with the interface module.

4. The method of claim 1, wherein the status associated with the array specific module is at least one of an "associated" state or the "in-progress state" or an "invalid" state.

5. The method of claim 4, wherein the status indicator being the "invalid" state indicates no association exists between the array independent module and the array specific module, and on first installation of the array specific module in the multipath application, changing the status of the array specific module from the "invalid" state to the "associated" state.

6. The method of claim 4, wherein the status indicator being the "in-progress" state indicates an upgrade to the array specific module is currently under progress, and on completion of the upgrade to the array specific module the status of the array specific module is changed from the "in-progress" state to the "associated" state.

7. The method of claim 6, wherein the suspended input/output operations are resumed after the status of the array specific module is changed to the "associated" state.

8. The method of claim 1, wherein on determination of the status being in the "in-progress" state, for any periodic health check of paths and logical units associated with the array specific module returning a result as "inconclusive".

9. The method of claim 8, further comprising:
on determination of the status being changed to the "associate" state from the "in-progress" state, retrying the health check of paths and logical units for the array specific module.

10. A computer program product for upgrading an array specific module of a multipath application comprising:
a non-transitory computer readable medium encoded with computer executable program code, wherein the code enables execution across one or more processors of:
checking a status associated with the array specific module, the array specific module being associated with an array independent module of the multipath application in order to register the status of the array specific module with the array Independent module;
on determination the status of the array specific module is an "in-progress" state,
suspending all input/output operations associated with the array specific module; and
upgrading the array specific module without disrupting input/output operations associated with the array specific module.

11. The computer program product of claim 10, the code enabling:
coupling the array specific module and the array independent module of the multipath application via an interface module, wherein the interface module maintains the status associated with the array specific module.

12. The computer program product of claim 10, the code enabling:
maintaining the status associated with the array specific module with the interface module.

13. The computer program product of claim 10, wherein the code enables the status associated with the array specific module is at least one of an "associated" state or the "in-progress state" or an "invalid" state.

14. The computer program product of claim 13, wherein the code enables the status indicator being the "invalid" state indicates no association exists between the array independent module and the array specific module, and on first installation of the array specific module in the multipath application, changing the status of the array specific module from the "invalid" state to the "associated" state.

15. The computer program product of claim 13, wherein the code enables the status indicator being the "in-progress" state indicates an upgrade to the array specific module is currently under progress, and on completion of the upgrade to the array specific module the status of the array specific module is changed from the "in-progress" state to the "associated" state.

16. The computer program product of claim 15, wherein the code enables the suspended input/output operations are resumed after the status of array specific module is changed to the "associated" state.

17. The computer program product of claim 10, wherein the code on determination of the status being in the "in-progress" state, for any periodic health check of paths and logical units associated with the array specific module returning a result as "inconclusive".

18. The computer program product of claim 17, wherein the code:
on determination of the status being changed to the "associate" state from the "in-progress" state, retrying the health check of paths and logical units for the array specific module.

19. A system for upgrading an array specific module of a multipath application comprising computer-executable logic operating in memory,
wherein the computer-executable program logic is configured to enable execution across one or more processors for:
checking a status associated with the array specific module, wherein the status associated with the array specific module is at least one of an "associated" state or the "in-progress state" or an "invalid" state, the array specific module being associated with an array independent module of the multipath application;
registering the status associated with the array specific module with the array independent module;
maintaining the status associated with the array specific module with an interface module of the multipath application;
on determination of the status of the array specific module being in an "in-progress" state,
suspending all input/output operations associated with the array specific module; and
upgrading the array specific module without disrupting any input/output operations associated with the array specific module, changing the status to the "associated" state on completion of the upgrade and resuming the suspended input/output operations after the status of the array specific module is changed to the "associated" state.

20. The system of claim 19, comprises an interface module coupling the array specific module and the array independent module of the multipath application, wherein the interface module is configured to maintain the status associated with the array specific module.

21. The system of claim 19, wherein the status indicator being the "invalid" state indicates no association exists between the array independent module and the array specific module, and on first installation of the array specific module in the multipath application, changing the status of the array specific module from the "invalid" state to the "associated" state; and wherein the status indicator being the "in-progress" state indicates an upgrade to the array specific module is currently under progress, and on completion of the upgrade to the array specific module the status of the array specific module is changed from the "in-progress" state to the "associated" state.

* * * * *